(12) United States Patent
Huebner

(10) Patent No.: US 6,296,926 B1
(45) Date of Patent: Oct. 2, 2001

(54) EMBOSSED SOUND TRACK

(76) Inventor: Stefan Huebner, Brucknerstrasse 17, D-81677 Munich (DE)

( * ) Notice: Subject to any disclaimer, the term of this patent is extended or adjusted under 35 U.S.C. 154(b) by 0 days.

(21) Appl. No.: 09/284,722

(22) PCT Filed: Aug. 14, 1998

(86) PCT No.: PCT/DE98/02458

§ 371 Date: Jun. 1, 1999

§ 102(e) Date: Jun. 1, 1999

(87) PCT Pub. No.: WO99/09556

PCT Pub. Date: Feb. 25, 1999

(30) Foreign Application Priority Data

Aug. 18, 1997 (DE) ................................ 197 35 740
Feb. 2, 1998 (DE) ................................ 198 04 001

(51) Int. Cl.⁷ .............................. B32B 3/00; A63H 3/33; G11B 31/00
(52) U.S. Cl. .......... 428/172; 428/163; 428/908; 369/68
(58) Field of Search .................. 428/156, 167, 428/172, 64.2, 141, 161, 163, 212, 908; 369/63, 68

(56) References Cited

U.S. PATENT DOCUMENTS

| | | |
|---|---|---|
| 695,159 | 3/1902 | Lambert . |
| 2,042,736 | 6/1936 | Schwartz . |
| 2,164,663 | 7/1939 | Ottofy . |
| 2,822,425 | 2/1958 | Hicks . |
| 2,997,306 | 8/1961 | Hicks . |
| 3,462,157 | 8/1969 | Barnett et al. . |
| 3,463,303 | 8/1969 | Gorman . |
| 3,515,390 | 6/1970 | Ryan et al. . |
| 3,648,385 | 3/1972 | Barlow et al. . |
| 3,735,350 | 5/1973 | Lemelson . |
| 4,121,835 | 10/1978 | Garabedian . |
| 4,381,558 | 4/1983 | Bearden . |
| 4,631,715 | 12/1986 | Hoover . |
| 4,962,950 | 10/1990 | Champion . |

FOREIGN PATENT DOCUMENTS

| | | |
|---|---|---|
| 136 447 | 3/1902 | (DE) . |
| 202594 | 10/1906 | (DE) . |
| G8612236.3 | 8/1986 | (DE) . |
| 36 16 469 | 11/1987 | (DE) . |
| 296 14 992 | 10/1996 | (DE) . |
| 2 339 227 | 8/1977 | (FR) . |
| 1 511 377 | 5/1978 | (GB) . |

*Primary Examiner*—Donald J. Loney
(74) *Attorney, Agent, or Firm*—Flynn, Thiel, Boutell & Tanis, P.C.

(57) ABSTRACT

The invention relates to a device for manual, mechanical reproduction of short audio information, consisting of a flat, multilayered material (1) in which a longitudinal profile (2) is embossed. The embossing die is produced by means of a milling process.

20 Claims, 7 Drawing Sheets

EMBOSSED SOUND TRACK

This invention relates to an apparatus for manual, mechanical reproduction of short sound information. It further relates to application of the apparatus in print products. The invention finally relates to a method for producing such a sound reproducing apparatus.

It is desirable in many cases to integrate sound information into mass-produced print products such as magazines, packages, books, greeting cards and the like. Providing the sound track gives the print product the additional function of a sound reproducing apparatus. The optical information can thus be supplemented by acoustic information.

Such an apparatus is known from U.S. Pat. No. 2,997,306 ("Book With Talking Pages"). This is a book whose pages have an elongate, relieflike sound track. The sound track is incorporated by embossing into the page which is made of a "stiff material such as paper or plastic." Scanning the sound track in the longitudinal direction with a special scanning stylus sets the page into audible mechanical oscillations.

The known apparatus involves the difficulty that the stated materials are not equally suitable for producing a sound reproducing apparatus and a print product. Conventional cardboard or paper has a rough surface which does not allow sufficient embossing of the fine sound relief. Scanning causes loud noise that considerably impairs the reproduction quality. Since paper and paperboard are normally not especially stable, the strip furthermore wears out quickly. Certain plastics allow much better embossing of the sound track but are harder to print and therefore rather unsuitable for print media.

A further disadvantage results from the necessity for a special scanning stylus. This is impractical to handle and can easily get lost.

Finally, series production is impeded by the fact that the sound track in the known apparatus is not flat but is pressed through so as to form an elevation on the underside (cf. FIG. 3 in U.S. Pat. No. 2,997,306). One must therefore always use not only a female mold (provided with the negative of the sound relief) for embossing, but also a male mold. One can accordingly only use machines permitting a male mold. Also, stackability and processing are impaired by reason of the elevation. Finally, the sound relief can also be compressed and thereby damaged by the load of sheets stacked thereabove.

For producing the sound track U.S. Pat. No. 4,121,835 ("Sound Producing Straw") and U.S. Pat. No. 695,159 ("Apparatus for Reproducing Sound") disclose embossing using embossing wheels. This method is elaborate and cannot be applied to print media without the construction of special apparatuses.

For providing the sound relief on the embossing wheel U.S. Pat. No. 695,159 ("Apparatus for Reproducing sound") states engraving as a method. DE 202594 ("Sprechmaschine mit Aufnahmewalze (bzw. Platte) mit schrauben-(bzw. spiral-) förmigen Rippen") states a method for producing a sound relief wherein a circular saw-like cutting wheel is mounted on a membrane and follows the motions of the membrane. The wheel cuts the relief into a rib moving past the cutting edge.

The known methods have the disadvantage that a special apparatus is necessary for engraving or cutting the relief. Generally, this is uneconomical.

The invention is thus based on the object of providing an apparatus for manual, mechanical reproduction of short sound information, in particular speech, which can be integrated into flat materials by embossing, permits high reproduction quality, has sufficient life, is easy to handle, and can be produced efficiently with usual apparatuses. It is further the object of the invention to find an embossing method for providing sound reliefs in print media using available machines. Finally, it is the object of the invention to find a method for providing a relieflike surface suitable as an embossing die in a simple way and using existing apparatuses.

The object is solved according to the invention by embossing in a multilayer material. Such materials can unite the property of being readily printable with the ability to be precisely contoured by embossing.

If one of the layers is paper, paperboard or cardboard, a further layer is preferably a lacquer layer. It is located on the side facing the sound track. Glossy lacquers are preferred to matt. Besides lacquer layers one can also use coating, foil laminations, and hot foil embossings applied before or with the embossing of the sound track. For the foil coating one particularly uses foils containing polypropylene, PVC as well as polyethylene, acetate, polyester and starch with thicknesses of about 10 microns to a few tens of microns. One can also use metal foils or metal-coated plastic foils. Combinations of several of the stated layers (e.g. a coated and lacquered cardboard material) are likewise part of the invention.

It is surprising that multilayer materials are suitable for simple production of detailed and lasting sound contours. One would have expected for example that the cardboard layer would yield too greatly during embossing or the coating be too hard to permit clean embossing of the contour. Also, one would have assumed that a lacquer layer would destroy the embossing die by lacquer settling in the fine grooves of the contour, or that the lacquer (or plastic, etc.) layer itself would be destroyed during embossing or detached from the cardboard. Amazingly, this is not, or only barely, the case.

The material is preferably multilayered over its whole surface, but it fundamentally suffices if only the area of the sound track is multilayered, e.g. in the form of a simple narrow foil strip or a partial printing with lacquer.

The sound track is executed so as to be sufficiently wide so that it can be scanned conveniently and reliably with the fingernail. This makes a scanning stylus superfluous and facilitates handling. The strip is thus at least about 8 millimeters wide, but preferably about 20 millimeters. The wide strip also increases life since the sound track is not always scanned at the same place.

One can of course also use objects other than the fingernail for scanning. In particular one can use the corner of an angular object for scanning, e.g. the corner of a diskette, a ruler or a card in check-card format (DIN 9752) such as a check card, credit card, telephone card, club card, health insurance card or identification card, or a bookmark. One can also use a calling card, postcard or other card made of stiff paper or cardboard. Objects with strongly convex edges, such as coins, are likewise suitable as scanning objects. A bent piece of wire, such as a paper clip, is also suitable.

Unlike in U.S. Pat. No. 2,997,306 ("Book With Talking Pages," FIG. 3) the sound track is flat on the underside, i.e. not pressed through so as to form an elevation on the underside of the material. This simplifies production since the sound track can be produced without use of a male mold. Processing is likewise facilitated since sheets without an elevation on the back are better stackable and can be processed better in stapling, gluing, packaging and other machines.

One avoids such pressing through by forming the sound relief in such a way that the multilayer material is compressed more in the area of the dales than in the area of the hills. The relief thus arises by compression and not by embossing. For this purpose at least one of the layers must consist of a sufficiently compressible material, preferably a fibrous material such as thick paper, cardboard, paperboard or a textile fabric. The material is compressed more in thickness than the relief is high. Even in the furthest protruding peak of the height profile the material is preferably compressed by at least ⅕ of its thickness. For a satisfactory result one usually requires materials with a total thickness (=over all layers) of at least 300 microns. If the sheets are stacked after embossing, the sound track is protected from being damaged by the load of the sheets thereabove because the total sound track is deeper than the surroundings after compressing. Finally, compression during embossing increases the strength of the material in the area of the sound track. The sound track thus wears out more slowly.

The embossing machines used are preferably the punching and embossing machines used for processing paper and cardboard in the printing industry. Such machines have never been used in the prior art for the purpose of producing a sound reproducing apparatus. However, tests have shown that the embossing force of these machines suffices to lastingly emboss the very fine and detailed height contour. This is astonishing since the embossing force of such machines is much lower than that attained with embossing wheels which have been used for embossing sound contours in the prior art. Furthermore, the new method allows especially efficient production since the embossing of the sound track can be done in one working step with grooving, punching or other embossings. Thus, one requires no additional operation e.g. when producing folding boxes.

In order to be able to use such machines one employs a flat die—i.e. not a embossing wheel—which bears the negative of the surface relief on its surface.

Cold embossing is the preferred production method because a good-quality relief can surprisingly be produced in the abovementioned materials without a heated die. Cold embossing is less elaborate than hot embossing, and machines for cold embossing and punching are much more widespread than hot embossing machines.

A further suitable embossing method is hot embossing. This method is used if the required reproduction quality, durability and stackability of the sound reproducing apparatus cannot be attained by cold embossing. This is frequently the case in particular with plastic foils or plates and very thin and/or plastic-coated cardboard. The die is heated and has a temperature between about 50 and 360° C. depending on the material, even higher with certain plastics. With plastic materials one selects an embossing temperature at which they are slightly plasticized.

One can improve optical appearance, and possibly abrasion resistance and definition, by hot foil embossing (e.g. employing a metalized or colored embossing foil), Hot foil embossing is executed either before the embossing of the relief or in one operation therewith.

The relief consists of a sequence of hills and dales extending transversely to the longitudinal direction of the sound track. The longitudinal contour, i.e. the sequence of hills and dales in the longitudinal direction of the sound track, is determined from the amplitude characteristic of the sound information to be coded, as follows.

First it is useful to adapt the sound information by filtering the reproduction characteristic of the material, e.g. to attenuate high frequencies if they are reproduced to a disproportionate extent during scanning of the contour. As in the production of radio commercials, one furthermore effects compression in the volume range in order to increase the subjectively perceived volume. The greater the ratio between the duration of the sound information to be coded and the length of the sound track, the closer together the hills and dales of the contour are and the lower the contour amplitude must be to maintain the angle and curvature conditions explained below. By compression on the time axis of typically 120 to 150% while simultaneous holding the pitches one can shorten the duration of the sound information. The expert is aware of devices and methods for performing the stated manipulations.

One now produces an embossing die provided with elevations and depressions which render the negative of the relief to be embossed. The die preferably has the height of 7 millimeters usual for embossing tools in paper and cardboard processing. It is thus compatible with most machines.

The production method for the die is characterized in that a milling apparatus is used in a special way. The relief is produced in a stock with the aid of a milling head tilted at an angle of about 30° to 60°—in particular 45°—from the longitudinal direction of the contour strip. The milling head has at least one precision cutting edge and preferably ends at right angles. With computer numerical control by suitable software the milling head runs over the surface relief line by line, the individual lines preferably extending parallel to the hills and dales of the relief. The milling head is preferably a carbide milling head.

The inventive method exploits in particular two circumstances.

The first circumstance relates to the necessary precision of the relief. Unlike that of a phonograph record for example, it is very low. Reproduction quality is not limited primarily by the precision of the relief but by the manner of scanning: manual handling allows very imprecise scanning of the longitudinal contour. The relatively primitive manner of amplification is a further reason. Amplification is usually obtained by simple cardboard as a membrane, optionally in conjunction with a hollow body. The amplitude of the contour is usually about 20 to 100 microns. The reason for this is firstly that high amplitude means high volume, which is very important in view of the primitive amplification. Secondly, the amplitude can be selected only so great that, as explained below, the amount of slope of the longitudinal contour is no greater than about 45° anywhere. With modern CNC milling machines, preferably of the high speed cutting type, one can attain positioning accuracies in the range of a few microns. This results in an accuracy of the milled contour which suffices to approximate the maximum reproduction quality attainable by manual scanning. This of course consequently only permits applications not requiring high reproduction quality. Amazingly, speech can be reproduced in readily intelligible fashion even with relatively low reproduction quality. Therefore, the stated method is particularly suitable for applications with spoken sound messages.

The second circumstance relates to the form of the surface relief. It consists of alternating hills and dales which extend (approximately) perpendicular to the scanning direction at the contact points between scanner and relief. Only such reliefs can be produced with the inventive method. The restriction that the method can only produce reliefs with aperture angles greater than 90° is not a disadvantage because the relief can be scanned the more cleanly the greater the aperture angles are. Furthermore this means that relatively low forces are exerted in the scanning direction during scanning, which permits effortless and uniform scanning. While the inventive method is thus generally unsuitable for producing usual embossed reliefs, it is surprisingly ideal for producing the inventive sound track.

Preferred materials for the die are steel and brass. These are the usual materials in processing cardboard and plastic by embossing. If necessary one can perform subsequent hardening e.g. by nitration in order to increase the life of the mold. In particular for embossing cardboard one can also use rigid plastics as materials. This opens up the possibility of producing a plurality of plastic embossing dies by molding from a master die. It should be noted that lasering with new high-definition laser tools is also conceivable as an alternative to milling.

The invention will hereinafter be explained in more detail with reference to the drawings, in which.

Figure 1:
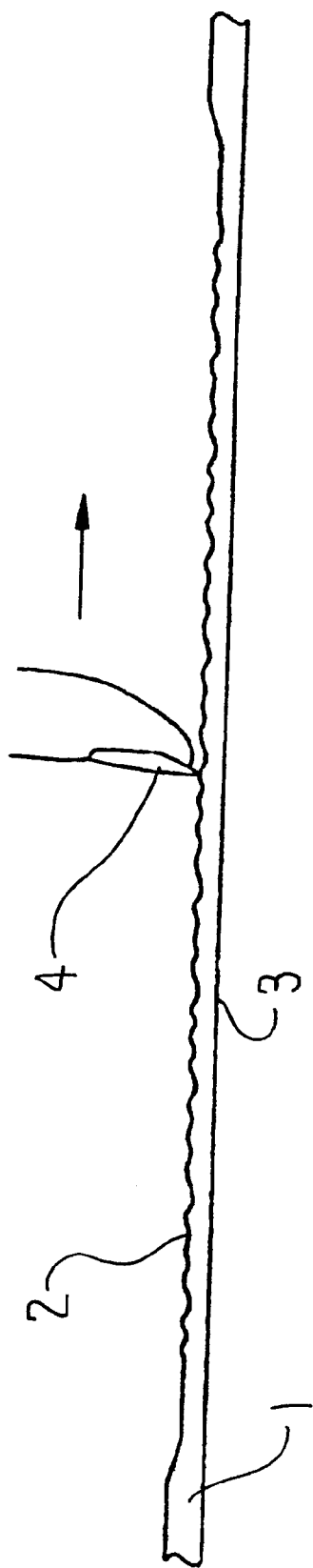
FIG. 1 shows a longitudinal section not true to scale through the sound track, and handling with the fingernail.

An inventive sound track (2) embossed into the material (1) is shown in FIG. 1. It is preferably about 200 millimeters long and consists of elevations and depressions extending perpendicular to the longitudinal direction. The sound track (2) is deeper than the surroundings, the back (3) is flat. Reproduction is effected by scanning with the fingernail (4) in the longitudinal direction.

Figure 2:
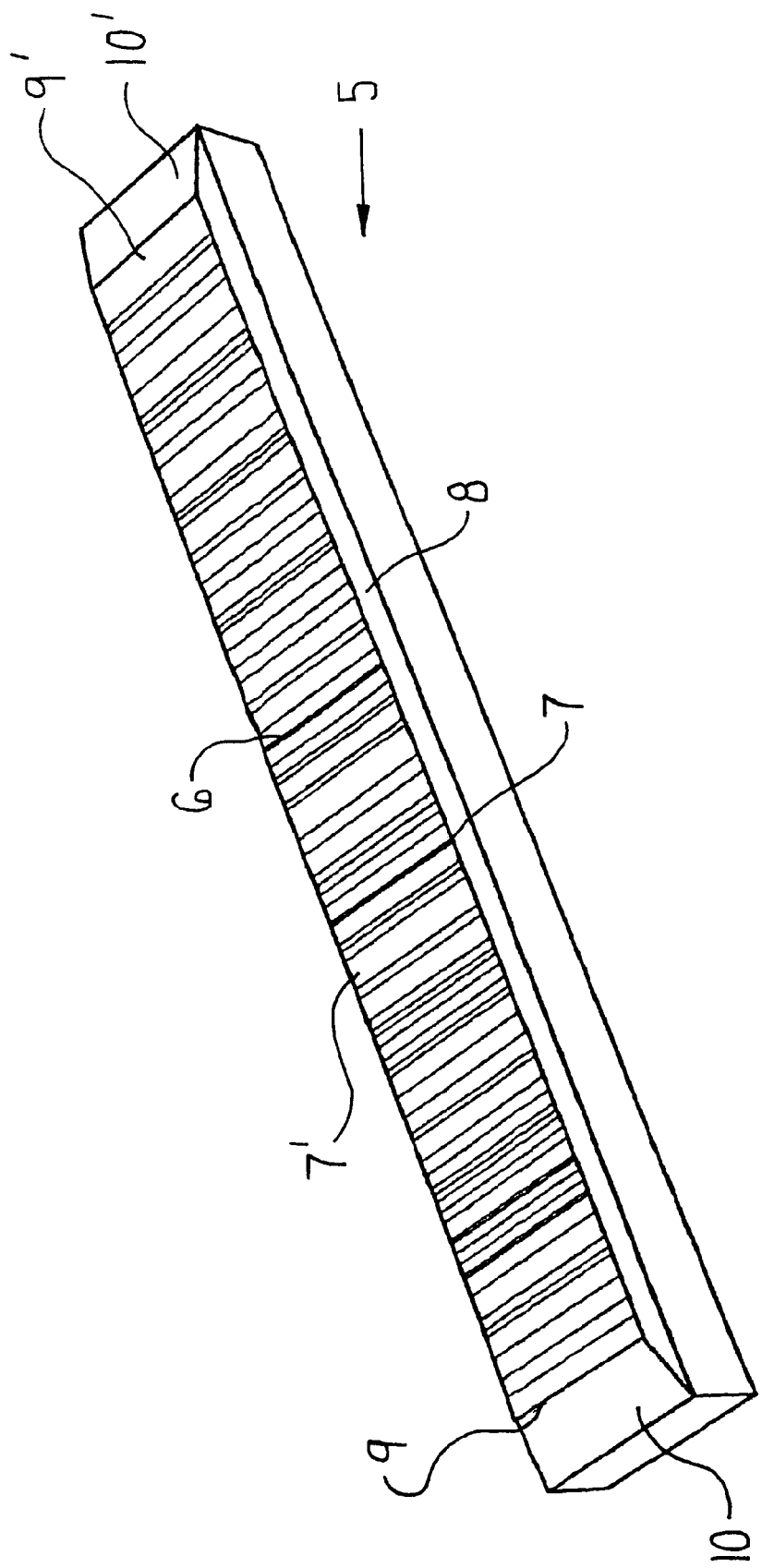
FIG. 2 shows a perspective representation of the embossing die.

FIG. 2 shows a preferred embodiment of the die (5). The long edges (7, 7') limiting the surface relief (6) are provided with a bezel (8) or a radius in order to prevent cutting of the material during embossing. At the narrow edges (9, 9') the relief ends with a slope (10, 10') which is gradual, preferably about 5°, in order to avoid a disturbing click at the beginning and end of the sound track which would arise with a fast transition (11, 11' in FIG. 1) from the deep sound track to the surroundings. The slope is so long, preferably about 20 millimeters, that no step arises during embossing.

Figure 3:
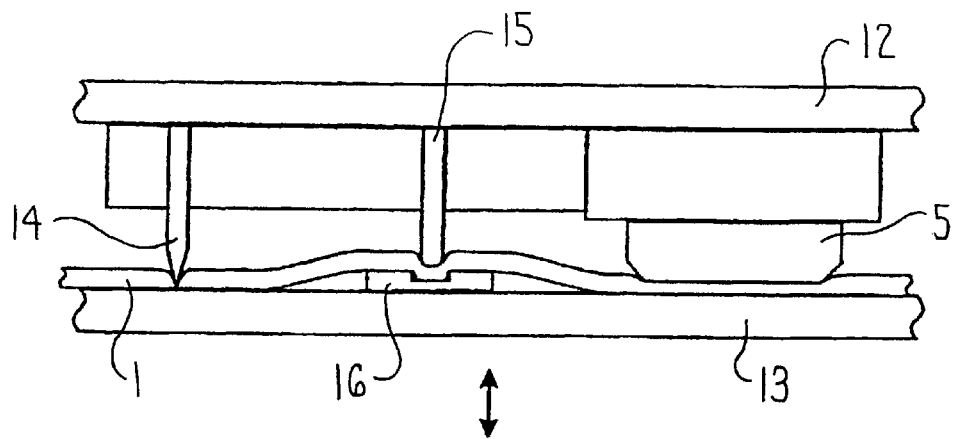
FIG. 3 shows a schematic representation of the embossing of the sound track with a cylinder punching machine.

FIG. 3 shows production with the aid of a flat punching and embossing machine. The machine has two platens (12, 13). One of the platens (12) bears the tools. For simultaneous embossing, punching and grooving it bears not only the die (5) but also a cutting knife (14) and grooving knife (15), with a corresponding opposing adjustment (16) on the second platen (13). During embossing the platens are pressed together at high pressure, the material (1) being located between tools and second platen. Generally only the tool platen (13) is heated for hot embossing.

Figure 4:
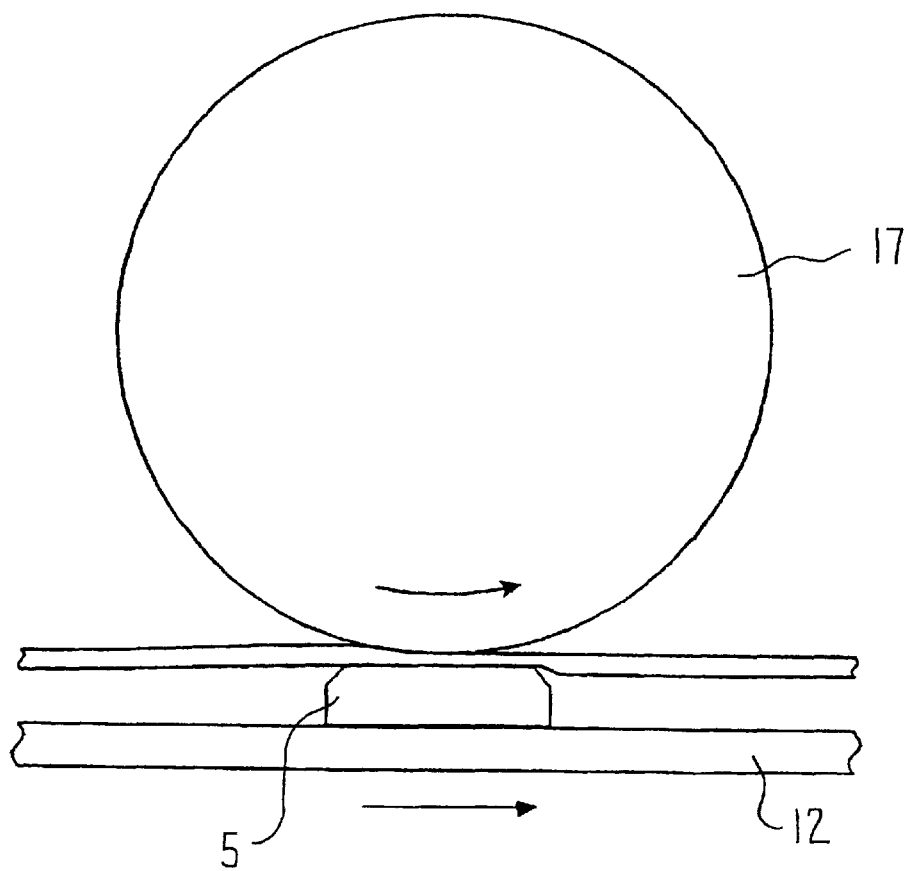
FIG. 4 shows a schematic representation of the embossing of the sound track with a flat punching machine.

FIG. 4 explains production with the aid of a cylinder punching machine. Here, too, the die (5) is mounted on a platen (12), but the counterpart is a roll (17) here.

Figure 5A:
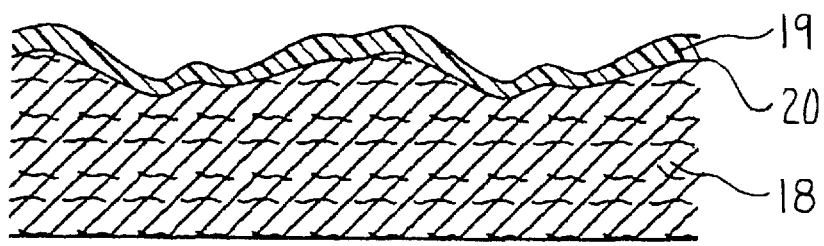
FIGS. 5a and 5b show two schematic representations of the layer structure of possible materials.

FIG. 5a shows a possible layer structure of material. A layer of fibrous material, e.g. cardboard (18), is combined with a lacquer layer, coating or a plastic foil (19) on the side of the sound track. The two layers (18) and (19) are optionally interconnected firmly at the boundary (20) by an adhesive layer, which is not separately shown. The fibrous material layer (18) is normally printed on the side facing the sound track for purposes of graphic design. Generally the side of the fibrous material layer (18) facing the sound track renders only the coarse features of the relief, while the details are embossed into the layer (19) of material facing the sound track.

Figure 5B:
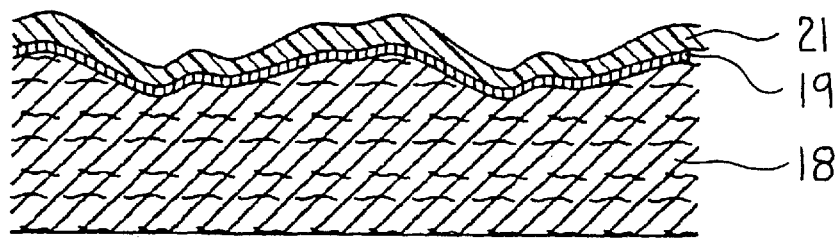

For diverse reasons, many print products of everyday life consist of suitable multilayer materials. Thus, book and catalog covers are often laminated for purposes of improved appearance or greater durability. FIG. 5b shows a suitable layer structure which occurs in folding boxes: fibrous material layer (usually cardboard) (18), coating (19) and lacquer or hot embossed foil (21). Adhesive layers are not shown separately. Each layer can also consist of a plurality of components, which are likewise not shown singly in the figure. In particular the laminating foil can be additionally lacquered or consist of a plurality of foil layers of possibly different material. Hot embossed foils often consist of a lacquer layer and a metal layer.

Materials with a more complicated layer structure are of course also part of the invention, e.g. the sequence of fibrous material, coating, lacquer, hot foil embossing. Cardboard food packages are in addition frequently provided with layers of metal and plastic foils to protect the contents. Plastic-coated textile fabrics like those used as labels in garments are also suitable materials.

Figure 6:
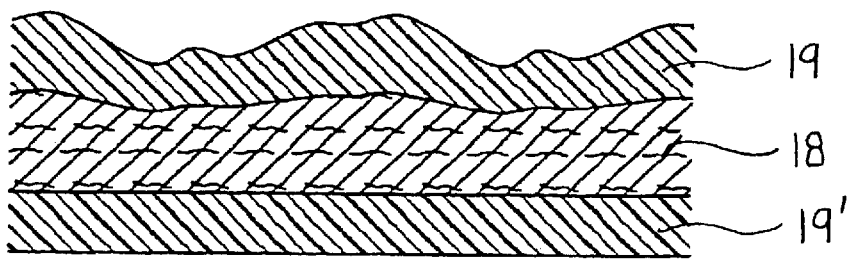
FIG. 6 shows a schematic representation of the layer structure of a further possible material.

ID and other cards frequently consist of paper or cardboard welded into plastic foil. FIG. 6 shows the layer structure of such a material with a core of paper or cardboard (18) between two layers of plastic foil (19, 19').

With materials having one or more cardboard layers it is advantageous to mount the sound track in such a way that its longitudinal direction corresponds to the direction of running of the fibers. Cardboard is stiffer in the direction of running than transversely thereto. The sound track is thus more stable in the longitudinal direction and yields less during scanning. It is furthermore easier to curve the strip transversely to the longitudinal direction and thereby increase stability in the longitudinal direction even further. Finally, one can thus counteract the wavy warps in the longitudinal direction in the area of the sound track which appear with some materials.

Figure 7:
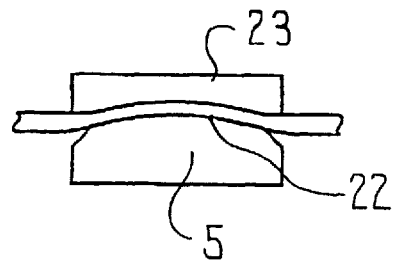
FIG. 7 shows a schematic representation of an embodiment of the embossing die with a slightly convex cross section.

Another way of counteracting such warps is to select a slightly concave or convex cross section (22) of the die (5) transversely to the longitudinal direction, as shown in FIG. 7. In this case, however, a male mold (23) is generally necessary as a counterpart to the embossing die.

Figure 8:
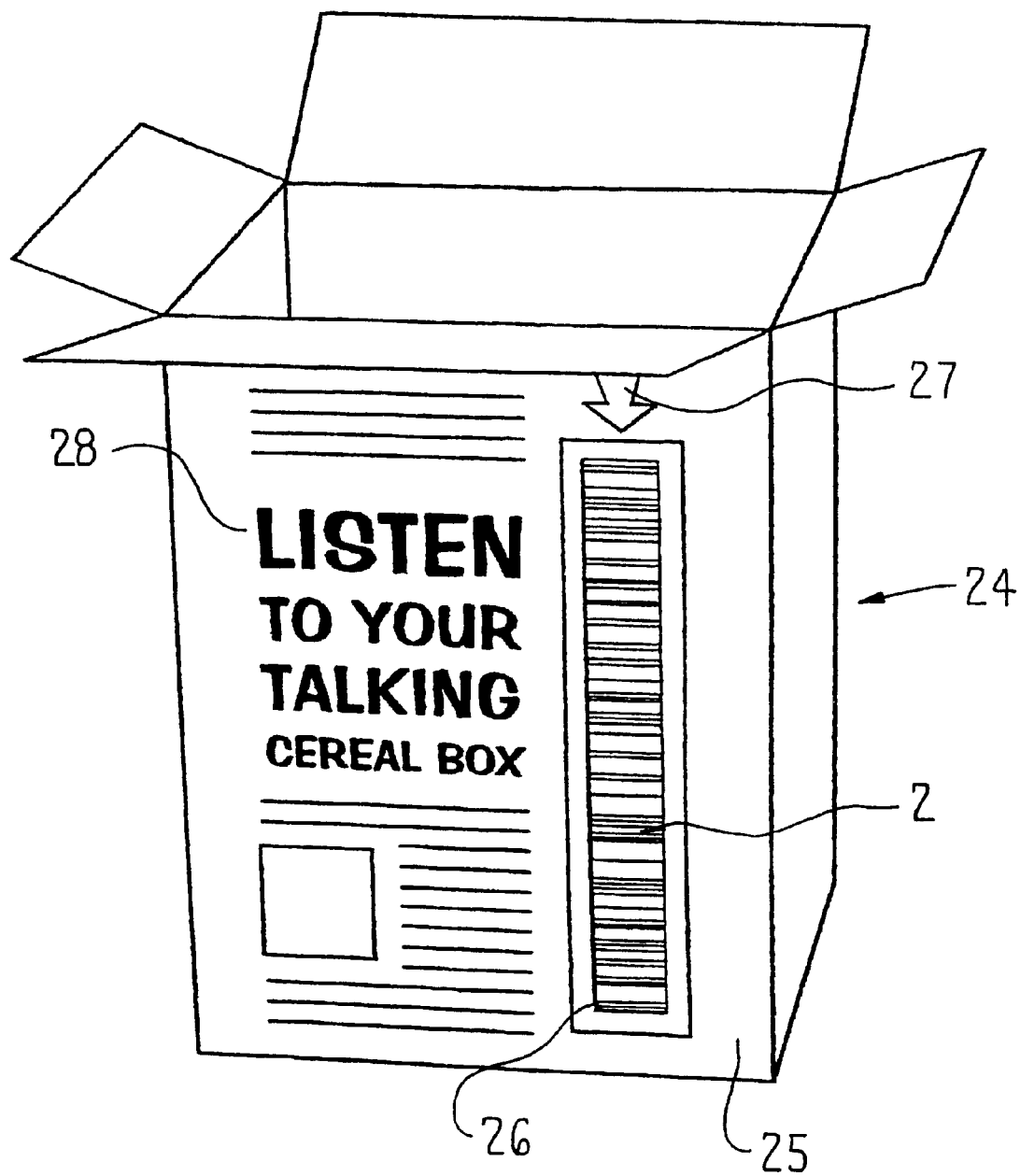
FIG. 8 shows a perspective representation of an embodiment of the sound reproducing apparatus as a folding box.

FIG. 8 shows an embodiment of the sound reproducing apparatus wherein the material is further processed into a hollow body (24), preferably a folding box. This has the special advantage that the hollow body acts as a resonant cavity. An outside surface (25) of the hollow body is provided with the sound track (2). When the fingernail or scanning object is passed over the sound track (2), this surface (25) is set into oscillations which are further amplified by the hollow body (24). The scanning object can also be for example the lid or a tear-off flap of the folding box. The latter is provided with a marking which makes proper handling easier for the user. Folding boxes which encase a bag containing the actual goods (e.g. cornflakes boxes) are especially suitable. The bag can be taken out before use, which clearly improves the reproduction quality. Hollow bodies other than folding boxes are of course also possible, such as cups, straws, package rolls, cans, jackets for CDs, videos and diskettes.

Figure 9:
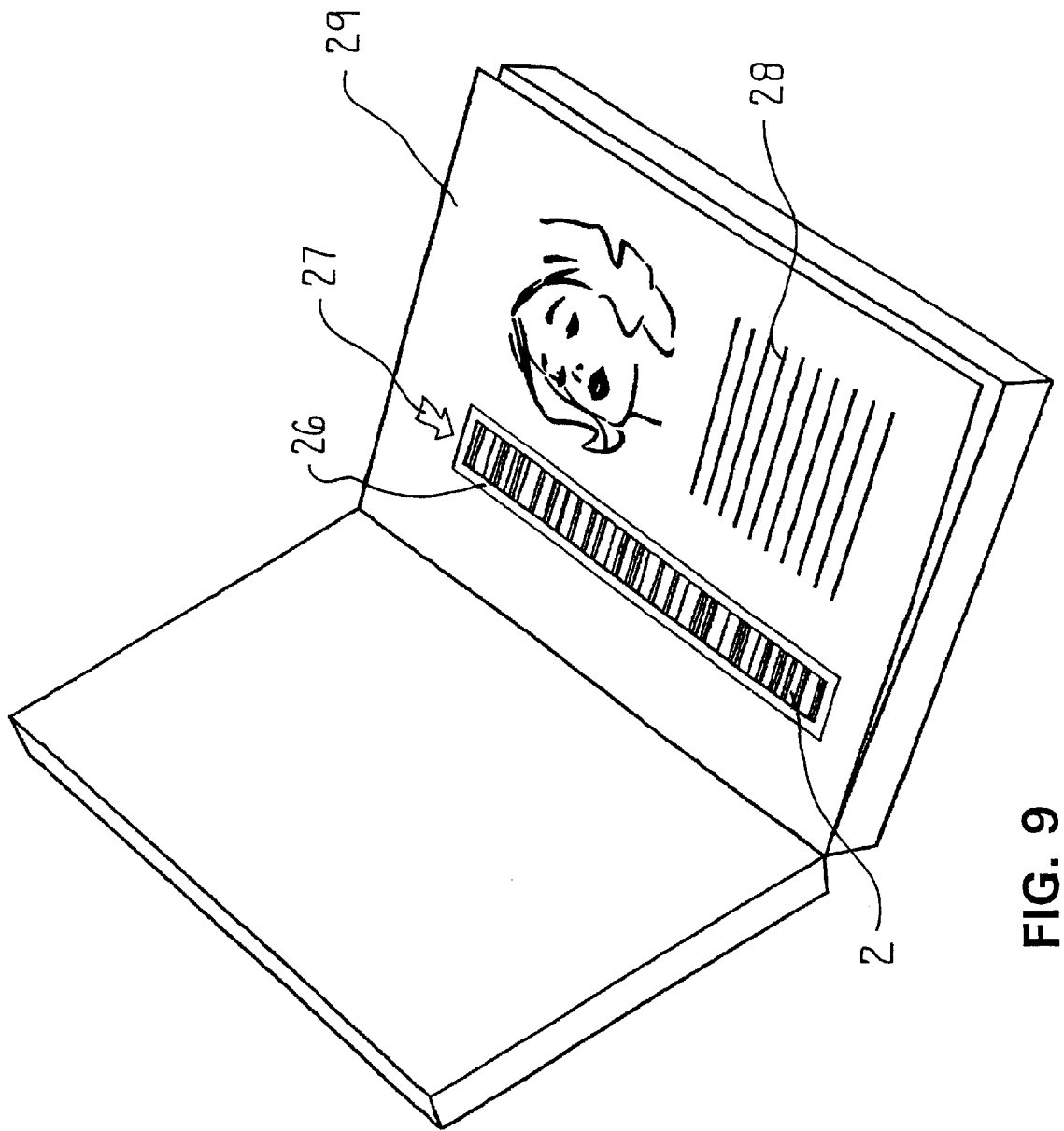
FIG. 9 shows a perspective representation of an embodiment of the sound reproducing apparatus as an insert in a magazine or a page of a book.

FIG. 9 shows an embodiment as a magazine insert, supplement or page of a book (29). The sound track can also be mounted on the magazine or book cover which is usually made of cardboard. If a scanning object other than the fingernail is to be used, this object might be mounted in easily detachable fashion on the page. For example, a coin might be glued on.

The sound track (2) is optically emphasized for easier orientation by the graphic design (26) of the material in the area of the sound track, e.g. a color marking. A marking (27) which indicates the direction of motion (preferably from the top to the bottom) facilitates use. The material is furthermore provided with an inscription (28) which relates in content to the sound track (2) or to the content thereof and preferably also contains instructions for use.

It is generally difficult for the user to scan the sound track (2) at uniform speed, even if he subjectively thinks he is doing so. The scanning speed generally increases at the beginning of the strip, while dropping at the end thereof. This leads to undesirable distortions in reproduction. In order to minimize such distortions it is expedient to provide the sound track (2) with leading and trailing portions which carry no information. This is done most simply by leaving corresponding room between the end of the sound track and the end of the page. The leading and trailing portions are each at least 10 milllimeters long, preferably 20 milllimeters. If the start or end of the sound information has no or only a small harmonic component (e.g. a sibilant), a shorter leading or trailing portion is frequently sufficient if the start or end of the sound is simultaneously formed to be shorter on the sound track.

Further conceivable applications are presentation folders, loose-leaf binders, files, puzzles, playing and collector's cards, craftwork sheets and greeting cards. Greeting cards provided with an embossing or with a certain form (e.g. that of the Eiffel Tower) by punching can be easily equipped with the inventive sound track in the same step. If one uses a material with a self-adhesive back, it is also possible to provide a sound carrier which can be applied to other objects.

The inventive sound reproducing apparatus, because it is relatively difficult to forge, can in many cases also perform the function of a security feature, e.g. in admission and transportation tickets and packages.

Figure 10:
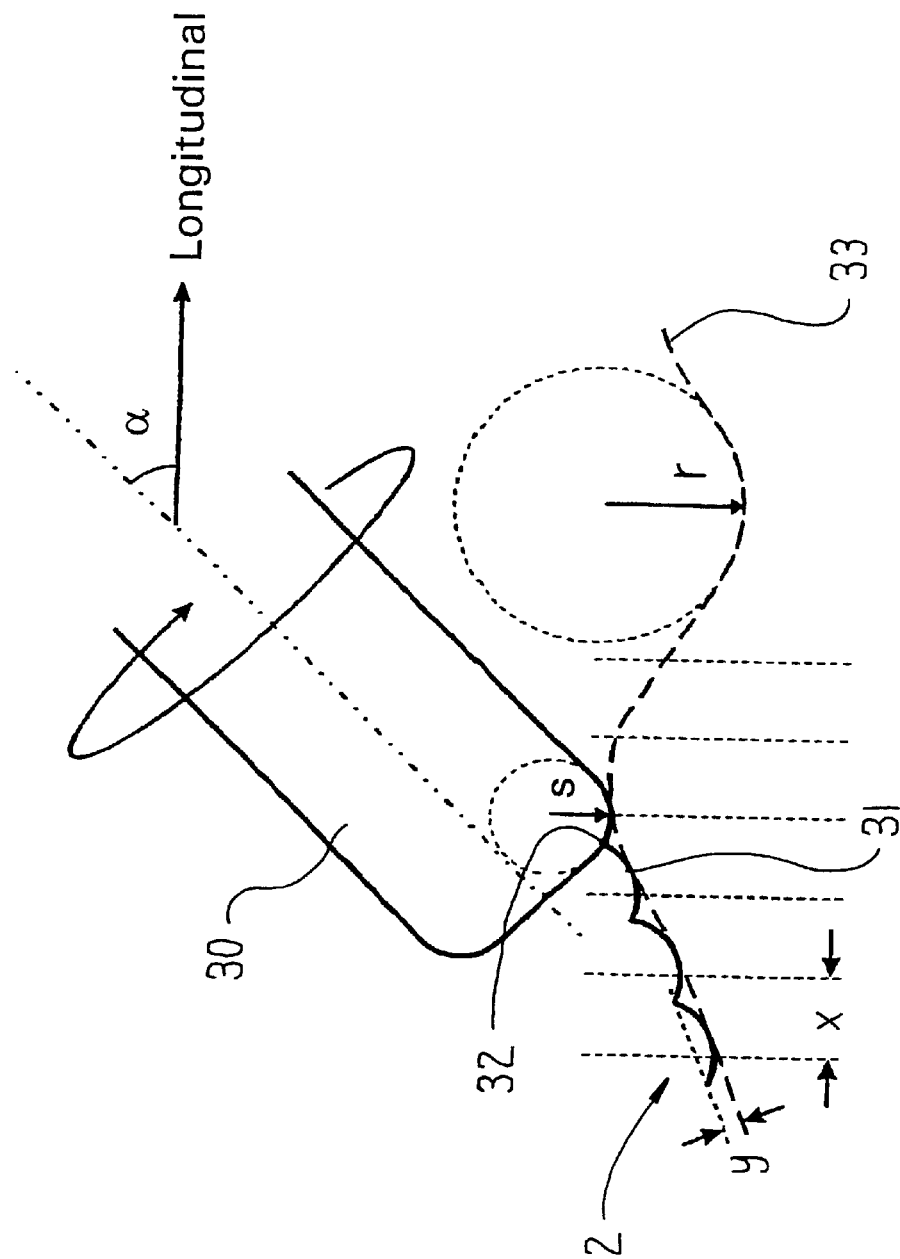
FIG. 10 shows a schematic representation of the production method with the milling head inclined by angle α to the direction of the longitudinal contour, and a cross section through the relief in the longitudinal direction which was produced by line-by-line running transverse to the longitudinal direction.

FIG. 10 elucidates the production of the surface relief of the die by milling. The relief (2) is run over line by line with the milling cutter (30) tilted according to the invention. The lines extend in the direction of the hills and dales, i.e. perpendicular to the sheet plane of the representation. The relative heights of the lines and their cross section jointly determine the contour pattern in the scanning direction. The cross section of each individual line (31) is determined by radius s of the cutting edge end (32).

A lower limit is set on the number of individual lines (and thus their spacing x at a given overall length of the sound track) since the frequencies evoked by the profile of the joined cross sections of the lines should be above the acoustically perceptible frequency range, i.e. above about 15 kHz. That is, each second of acoustic information must be coded in at least about 15,000 lines.

Furthermore, the curved profile of the lines, which is determined by radius s of the cutting edge, signifies a loss of precision of the longitudinal contour. Deviation y of the real longitudinal contour (2) from the ideal line (33) should not be essentially greater than the precision given by the positioning accuracy of the tool, e.g. 1 micron. This is attained if radius s of the cutting edge end (32) is as great as possible, whereby the radius cannot be greater than smallest radius of curvature r of the longitudinal contour, usually about 20 microns. Line spacing x is then selected so that deviation y remains within the stated range. One goes by the approximation formula:

$$x \leq \sqrt{4sy - 2y^2}$$

If s is 20 microns and y is 1 micron one obtains line spacing x of about 7 microns. As the lower limit one thus obtains about 1,500 lines per centimeter of contour. In the preferred embodiment the mold is about 20 to 30 centimeters long and two to three centimeters wide. By reason of the relatively great line spacing, this results in an overall length of less than 1,000 meters which the milling cutter must cover. With modern milling tools—in particular multiple-edged carbide tools, e.g. six-edged tools—it is therefore possible to produce the total sound track within the edge life of a single tool. This is an important advantage since a tool change would necessitate very high effort for positioning the new tool.

What is claimed is:

1. A device for reproducing recorded sound, said device comprising:

a membrane capable of mechanical oscillation;

an elongated substrate formed from compressible material, said substrate being integrally bonded to said membrane so that said membrane and said substrate move in unison wherein the material forming said substrate is selectively compressed so as to define a sequential series of peaks and valleys, the peaks and valleys collectively defining a varying height surface relief that extends along a longitudinal length of said substrate; and a contact layer disposed over and bonded to said elongated substrate, said contact layer being formed from one from the group consisting of: lacquer; plastic; metal; and ceramic and said contact layer is shaped to have an outer surface that is shaped to have a surface relief that corresponds to the surface relief of said elongated substrate and is further shaped so that the application of a scanning object along the length of said contact section results in the oscillation of said substrate and said membrane that generates a recorded sound.

2. The device of claim 1, wherein said contact layer is further formed so that the surface relief is defined by a plurality of spaced apart contact lines that extend perpendicularly to the longitudinal axis of said contact layer and have a density along said contact layer of at least 15,000 lines per second of time the scanning object is moved along said contact layer.

3. The device of claim 1, wherein said elongated substrate and said contact layer have a width of at least 8 mm.

4. The device of claim 1, wherein said contact layer is shaped so that the surface relief has a depth between 20 and 100 microns.

5. The device of claim 1, wherein said contact layer is shaped so that the surface relief has a maximum slope in a longitudinal orientation of said contact layer of 45°.

6. The device of claim 1, wherein said contact layer is shaped so that the surface relief has a leading section with a constant slope.

7. The device of claim 1, wherein said contact layer is shaped so that the surface relief has a trailing section with a constant slope.

8. The device of claim 1, wherein said membrane and said elongated substrate are formed from a unitary piece of compressible material.

9. The device of claim 8, wherein the compressible material forming said membrane and said elongated substrate is compressed at least 20% in vicinity of said elongated substrate relative to the compressible material forming membrane.

10. The device of claim 8, wherein:

the compressible material forming said membrane has a thickness of at least 300 microns and the membrane has an outer surface; and said elongated substrate is compressed and said contact layer has a thickness so that the surface relief of said contact layer is located below the outer surface of said membrane.

11. A device for reproducing recorded sound, said device comprising:

a substrate formed from compressible material, said substrate having:
an elongated section that is compressed so as to define a sequential series of peaks and valleys, the peaks and valleys collectively define a varying height surface relief that extends along a longitudinal length of said elongated section; and
a membrane section that is contiguous with said elongated section, said membrane section having an outer surface; and a contact layer disposed over and bonded to said substrate elongated section, said contact layer being formed from one from the grouping consisting of: lacquer; plastic; metal; and ceramic and said contact layer is shaped to have a contact surface that is shaped to have a surface relief that corresponds to the surface relief of said substrate elongated section and that is further shaped so that the application of a scanning object along the length of said contact section results in the generation of a recorded sound by said substrate and said outer layer; and wherein, said substrate elongated section is compressed to such an extent and said contact layer has a thickness so that the contact surface of said contact layer is located below the outer surface of said substrate membrane section.

12. The device of claim 11, wherein said substrate elongated section and said contact layer collectively have a thickness of less than 300 microns.

13. The device of claim 11, wherein said substrate is formed from fibrous material.

14. The device of claim 13, wherein the fibrous material from which said substrate is formed is one selected from the group consisting of: paper; paperboard; cardboard; and fabric.

15. The device of claim 11, wherein said substrate has a back surface that is opposite the surface relief of said elongated section and the outer surface of said membrane section and said back surface is planar opposite the surface relief of said elongated section.

16. The device of claim 11, wherein said substrate is formed so that the compressible material that forms said elongated section is compressed at least 20% relative to the compressible material that forms said membrane section.

17. The device of claim 11, wherein:

said contact layer is a section of an outer layer that extends over both said substrate elongated section and said substrate membrane section and said outer layer has a top surface that extends over the outer surface of said substrate membrane section; and said substrate elongated section is compressed to such an extent and said outer layer has a thickness so that the contact surface of said contact layer is located below the top surface of said outer layer.

18. The device of claim 17, wherein said substrate membrane section and said outer layer collectively have a thickness of at least 300 microns.

19. The device of claim 18, wherein said substrate is formed so that the compressible material that forms said elongated section is compressed at least 20% relative to the compressible material that forms said membrane section.

20. The device of claim 11, wherein said substrate and said contact layer have a width of at least 8 mm.

* * * * *